United States Patent Office 3,341,363
Patented Sept. 12, 1967

3,341,363
METHOD OF MAKING A THIN-FILM ELECTRONIC COMPONENT

Charles J. Owen, 11 Deerfield Drive, Owego, N.Y. 13827

No Drawing. Filed May 27, 1963, Ser. No. 283,603
1 Claim. (Cl. 117—227)

The present invention relates to thin-film passive electronic components, and in particular, to resistors producible rapidly with use of an oven of relatively low maximum-temperature capability. Such components hitherto known have been produced by a method involving prolonged baking time (several hours) and/or use of relatively high baking temperatures (about 1000° C. or greater). Accordingly, it is an object of my invention to provide a method whereby use of such times and temperatures is avoided and such component is thus produced far more economically.

In brief summary, the invention comprises adaptation of the thermite-reaction concept to the production of thin or essentially two-dimensional passive electronic components. I have discovered that by combining effective amounts of silicon metal as fuel, magnesium metal as igniter, and trioxide of molybdenum and/or tungsten as oxidant, a composition is obtained which, when applied to a suitable heat-resistant substrate in suitable film thickness (about 10 mils), dried to remove the vehicle, and heated to firing temperature, yields and exothermic chemical reaction sufficiently controllable to be adapted to the purposes of this invention. I have discovered, moreover, that the addition of small but effective amounts of alumina to the admixture to be fired suppresses development of undesirably high flame temperatures and aids in retention of film shape. I have also discovered that component conductivity is promoted by addition to the admixture of cobalt, molybdenum, or tungsten in elemental form, or of molybdenum disilicide. The above-mentioned additions may be practiced singly or in desired combination. I have further discovered that the reactant-containing film may itself upon firing comprise the electronic component and/or may by the heat of its reaction fuse a contiguous film stratum which may act as an electronic component or part thereof, as in a sandwich structure.

The present invention may be more fully understood in the light of the following specific examples:

*Example I*

In the presence of a measured amount of squeegee oil, there were admixed 15.3 parts of silicon metal powder, 84.7 parts of tungsten trioxide, 60 parts of molybdenum disilicide, 30 parts of cobalt metal powder, 25 parts of tungsten metal powder, 25 parts of molybdenum metal powder, 30 parts of magnesium metal powder, 20 parts of an adherence-promoting mixture composed of 50 weight percent kaolin and 50 weight percent of high-firing (1175° C.) commercial glaze material, and 160 parts of a reaction-retardant mixture composed of 40 weight percent alumina, 40 weight percent molybdenum disilicide, and 20 weight percent cobalt metal powder. The amount of squeegee oil was 22% by weight of all above-mentioned components. All metal powders were substantially pure and minus 325 mesh. All parts above-mentioned are by weight. Mixing was continued to produce a uniform composition. Using a 180-mesh stainless-steel screen having a pattern outlined thereon, a film of the mixture about 10 mils thick, was screen-printed onto a glazed, cast-alumina substrate having a suitable conductor pattern already printed thereon. Suitable material for such conductor pattern is described in my prior joint patent with M. N. Haller, United States Patent No. 3,079,285, issued Feb. 26, 1963. The substrate was placed on a hot plate at about 180° C. to volatilize the major portion of the oil in the printed pattern. The thermitic mixture was then fired by placing the substrate in a furnace heated to about 700° C. The mixture ignited at a temperature of 610° C. and developed a maximum flame temperature of 725° C. A resistor exhibiting reasonably good retention of shape was obtained.

*Example II*

A sandwich-type resistor was prepared as follows: Upon a glazed cast-alumina substrate having a suitable conductor pattern already printed thereon, there was printed, using a 180-mesh stainless-steel screen, a rectangle about 10 mils thick of a resistor composition composed of 70 parts molybdenum disilicide, 25 parts high-firing commercial glaze material having a maturing temperature of 1100 to 1175° C., 5 parts sodium oxide, and about 20 parts of squeegee oil. The resistor pattern was dried by heating on a hot plate at about 180° C. A layer composed of about 80 parts alumina and 20 parts squeegee oil was printed over the resistor pattern and likewise dried. A layer of the thermitic mixture of Example I was overprinted and likewise dried. Upon firing in a furnace at about 700° C., a useful sandwich resistor was obtained. Upon temperature cycling from room temperature to 400° C. at a rate of 1° C. per minute, a temperature coefficient of resistance of about 6 ohms per 1000° C. was observed.

*Example III*

A sandwich-type resistor was prepared as follows: Upon a glazed cast-alumina substrate having a suitable conductor pattern already printed thereon, there was printed, between the conducting connections, using a 180-mesh stainless-steel screen, a rectangle about 10 mils thick of a low-firing commercial glaze material having maturing temperature of 500 to 550° C. mixed to a paste consistency and being composed of 80 parts of said glaze and 20 parts of squeegee material. The glaze pattern was dried by heating on a hot plate at about 180° C. A layer of the thermitic mixture of Example I was overprinted and likewise dried. Upon firing in the furnace at about 700° C., a useful sandwich resistor was obtained.

*Example IV*

A useful thermite-formed resistor was obtained by admixing in the presence of a measured amount of squeegee oil, 15.3 parts of silicon metal powder, 84.7 parts of tungsten trioxide, 60 parts of molybdenum disilicide, 30 parts of cobalt metal powder, 15 parts of magnesium metal powder, 20 parts of an adherence-promoting mixture composed of 50 weight percent kaolin and 50 weight percent of high-firing (1175° C.) commercial glaze material, and 160 parts of a reaction-retardant mixture composed of 40 weight percent alumina, 40 weight percent molybdenum disilicide, and 20 weight percent cobalt metal powder. The amount of squeegee oil was 22% by weight of all above-mentioned components. All metal powders were substantially pure and minus 325 mesh. All parts above-mentioned are by weight. Mixing was continued to produce a uniform composition. Using a 180-mesh stainless-steel screen having a pattern outlined thereon, a film of the mixture about 10 mils thick, was screen-printed onto a glazed, cast-alumina substrate having a suitable conductor pattern already printed thereon. Suitable material for such conductor pattern is described in my prior joint patent with M. N. Haller, No. 3,079,285, issued Feb. 26, 1963. The substrate was placed on a hot plate at about 180° C. to volatilize the major portion of the oil in the printed pattern. The thermitic mixture was then fired by placing the substrate in a furnace heated to about 700° C. The mixture ignited at a temperature of 605° C., and developed a maximum flame temperature of 785° C. A resistor exhibiting good shape retention was obtained.

*Example V*

Example IV was repeated, except that 106 parts of reaction-retardant mixture were used instead of 160 parts. A resistor of fair shape-retention properties, but inferior to that of the preceding example, was obtained.

*Example VI*

Example IV was repeated, except that 212 parts of the reaction-retardant mixture were used instead of 160 parts. Although, upon firing, the shape-retention properties were good, the conductive properties of the intended resistor element were lost. This, taken together with the preceding two examples, demonstrates that the addition of reaction-retardant mixture passes through an optimum, limited by the considerations that (1) amounts too small retard the reaction insufficiently and do not afford optimum shape retention; and (2) amounts too large reduce undesirably the conductivity of the resistor pattern.

Although I have disclosed herein the preferred practice of my invention, I intend to cover as well any change or modification therein which may be made without departing from the spirit and scope of the invention.

I claim:

A method of making a thin-film, passive electronic component comprising the steps of (a) admixing to uniformity, with about 93.5 parts of squeegee oil, about 15.3 parts of silicon metal powder, about 84.7 parts of tungsten trioxide, about 60 parts molybdenum disilicide, about 30 parts cobalt metal powder, about 25 parts tungsten metal powder, about 30 parts magnesium metal powder, about 20 parts of an adherence-promoting mixture composed of about 50 weight percent kaolin and about 50 weight percent of high-firing commercial glaze material, and about 160 parts of a reaction-retardant mixture composed of about 40 weight percent alumina, about 40 weight percent molybdenum disilicide, and about 20 weight percent cobalt metal powder, all parts by weight and said metal powders being minus 325 mesh, the admixture thus produced being capable of being passed through a 180-mesh screen, (b) applying to a glazed, cast-alumina substrate said admixture in the form of a film about 10 mils thick, (c) heating said substrate and film to a temperature of about 180° C. to volatilize the major portion of said squeegee oil, and (d) heating said substrate and film further in an environment of about 700° C. to cause thermitic reaction in said film.

References Cited

UNITED STATES PATENTS

| | | | |
|---|---|---|---|
| 2,496,971 | 2/1950 | Wiczer | 117—22 |
| 2,775,531 | 12/1956 | Montgomery | 117—22 |

ALFRED L. LEAVITT, *Primary Examiner.*

WILLIAM L. JARVIS, *Examiner.*